United States Patent [19]

Tokutomi et al.

[11] 4,293,206

[45] Oct. 6, 1981

[54] ELECTRICALLY OPERATED AUTOMATIC FOCALIZING CAMERA

[75] Inventors: Seijiro Tokutomi, Tokyo; Masao Jyojiki, Tsurugashima; Harumi Aoki, Kiyose; Kazuo Nakamura, Shiki; Koichiro Watanabe, Funabashi, all of Japan

[73] Assignee: Asahi Kogaku Kogyo Kabushiki Kaisha, Tokyo, Japan

[21] Appl. No.: 114,174

[22] Filed: Jan. 22, 1980

[30] Foreign Application Priority Data

Feb. 16, 1979 [JP] Japan .................... 54/18641[U]

[51] Int. Cl.³ ............................................... G03B 3/10
[52] U.S. Cl. .................................................... 354/25
[58] Field of Search ...................... 354/25; 352/140; 355/56; 350/46

[56] References Cited

U.S. PATENT DOCUMENTS 4,223,988  9/1980  Jyojiki et al. ................ 354/25

Primary Examiner—Michael L. Gellner
Attorney, Agent, or Firm—Sughrue, Mion, Zinn, Macpeak & Seas

[57] ABSTRACT

A camera including an automatic focalizing device with which the camera will automatically focus only upon objects within a predetermined range set by the photographer. The wiper of a potentiometer is coupled to the lens so that its operative position is determined by the position of the lens. The wiper is also electrically coupled to respective positive and negative comparison inputs of first and second comparators to the other inputs of which are applied voltages from a second potentiometer which are determinative of the selected range at which focalization may be achieved. The combined outputs of the comparators are coupled to the control input of an analog switch device coupled between the output of a focus detector and the control circuit of a lens positioning motor.

3 Claims, 3 Drawing Figures

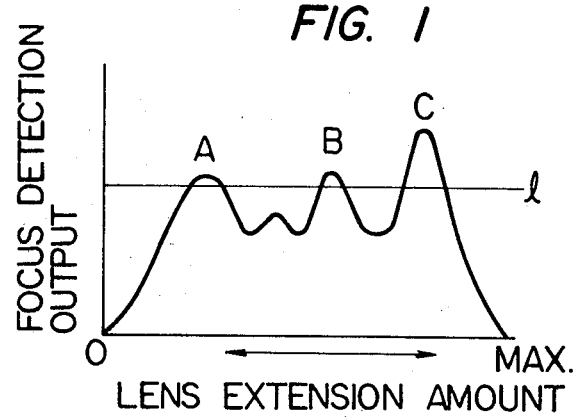
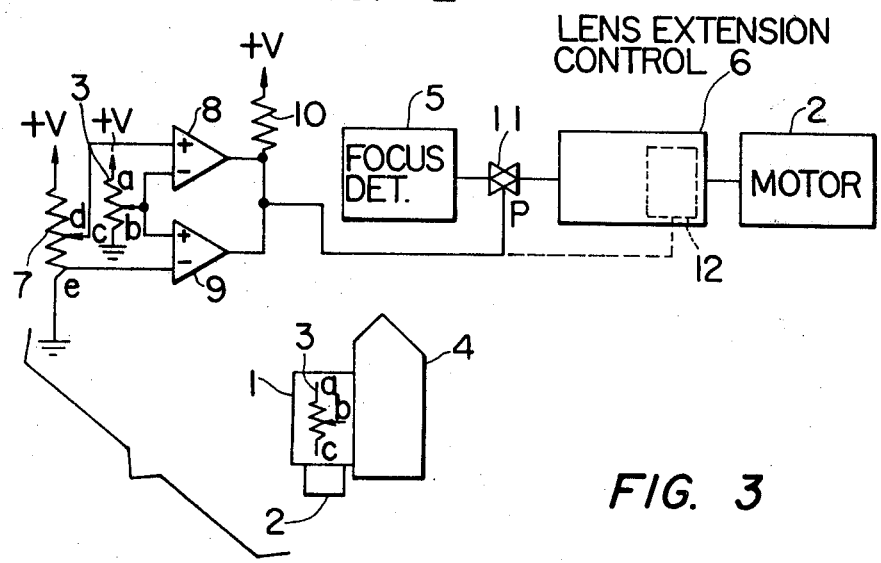
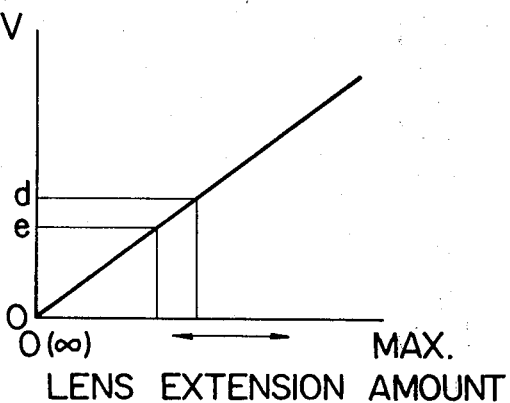

4,293,206

ELECTRICALLY OPERATED AUTOMATIC FOCALIZING CAMERA

BACKGROUND OF THE INVENTION

The present invention relates to an improvement of an electrically operated automatic focalizing camera. More specifically, the invention relates to a device for preventing erroneous operation of the camera due to conditions of an object to be photographed.

A variety of electrical focus detecting devices have been proposed in the art. The relation between focus detection output and the distance by which the lens has been extended in such a device is as indicated in FIG. 1. In FIG. 1, the vertical axis represents the focus detection output and the horizontal axis represents the lens extending distance or amount. Furthermore, in the graph shown in FIG. 1, the peaks A, B and C indicate three objects positioned at different distances from the camera. In the case when distance to an object is determined using such a signal, a technique has been employed in which a certain level (indicated by l in FIG. 1) is chosen and peaks higher than the level are detected. However, if a focalization indicating device is used, then focalization indication is provided for the peaks A and C even though the desired object corresponds to the peak B for instance. Furthermore, with an automatic focalizing device, the lens will be set for the peak C in a system in which only the maximum peak is detected or the lens will be set for the peak A or C in a system in which the lens extension is carried out using the closest focusing distance or starting from infinity with the first peak from that position detected. In none of the systems can the lens be focused on the intended object. There are many examples of such objects, for instance, animals in a cage and people in a crowd.

Accordingly, an object of this invention is to provide an electrical focus detecting device which can be used for objects as described above by presetting an object distance at which focus detection is to be performed.

SUMMARY OF THE INVENTION

In accordance with this and other objects of the invention, there is provided an electrically operated automatic focalizing camera including an electrical focus detecting device for providing a focus detection signal, means for positioning the photographing lens in response to a signal at an input thereto, means for converting a position of the photographing lens of the camera into a voltage, means for setting a range of voltage corresponding to an amount of extension of the lens, means for determining whether or not a voltage corresponding to an amount of extension is within the set range of voltage, and means for receiving a decision output from the determining means for controlling transmission of the focus detection signal, the transmission controlling means being operatively coupled between the focus detecting device and the input of the positioning means. There may further be provided lens extending speed control means receiving the decision output for controlling a lens extending speed.

BRIEF DESCRIPTION OF THE DRAWINGS

FIG. 1 is a graphical representation indicating the detection outputs of an electrical focus detecting device versus the amount of extension of a lens.

FIG. 2 is a circuit diagram, partly as a block diagram, showing an example of an automatic focalizing camera according to the invention.

FIG. 3 is a graphical representation indicating the voltage at the wiper b of a variable resistor 3 in FIG. 2 versus the amount of extension of a lens 1.

DESCRIPTION OF THE PREFERRED EMBODIMENTS

The present invention will be described with reference to a preferred embodiment. An example of an automatic focalizing camera constructed in accordance with the teachings of the invention, as shown in FIG. 2, includes a lens 1; a lens driving motor 2; a variable resistor 3 for detecting an amount of extension of the lens 1, the variable resistor 3 having a wiper b which slides on the resistance member a-c thereof; a camera body 4; a focus detecting circuit 5; a control circuit 6 for the lens extending motor 2; a variable resistor 7 for setting the range of the focus detection distance; open collector type comparators 8 and 9; a pull-up resistor 10; and an electronic switch.

The operation of the camera thus constructed will be described. FIG. 3 is a graphical representation indicating the voltage at the wiper b of the variable resistor 3 versus the position of the lens 1. As is apparent from FIG. 3, as the lens is moved from a position corresponding to infinity to a position corresponding to the closest focusing distance, the voltage on the wiper b increases from zero to the maximum. The distance range of an object to be subjected to focus detection can be set by setting the voltages on the wipers d and e of the variable resistor 7 to correspond to a desired amount of lens extension and equivalent object distance on the horizontal axis of the graphical representation in FIG. 3 before a photographing operation. When, under this condition, the automatic focus detecting device is operated, focus detection of an object positioned at a distance corresponding to the set amount of extension of the lens is effected by the focus detecting circuit 5. The focus detection signal is applied through the electronic switch 11 to the lens extension control device 6. This detection signal is applied to the following stage when the switch 11 is turned on, that is, with the control terminal p at a high logic level. However, the on-off operation of the switch 11 is controlled by the amount of extension of the lens 1. The voltage at the wiper d of the variable resistor 7 is applied to the positive input terminal of the comparator 8 while the voltage at the wiper e of the variable resistor 7 is applied to the negative input terminal of the comparator 9. The voltage at the wiper b of the variable resistor 3 is applied to the negative input terminal of the comparator 8 and to the positive input terminal of the comparator 9. Under this condition, the voltage at the connected output terminals of the comparators 8 and 9, that is, the voltage at the control terminal p of the electronic switch 11, is raised to a high logic level only when the voltage at the wiper b of the variable resistor 3 is between the voltages at the wipers d and e of the variable resistor. That is, the electronic switch 11 is rendered conductive only when the amount of extension of the lens 1 is between amounts of extension corresponding to the voltages at the wipers d and e of the variable resistor 7. Accordingly, the focus detection signal of an object positioned out of the object distance range which is defined by the amounts of extension corresponding to the voltages at the terminals d and e of the variable resistor 7 is not applied from the focus detecting circuit 5 to the lens extension control device 6 and only the focus detection signal of an object in the object distance range as described above is transmitted to the lens extension control device 6. Therefore, the control device 6 applies a stop signal to the lens driving motor 2 to cause the lens 1 to focus on the object only in the object distance range.

The circuitry shown in FIG. 2 may be modified, as indicated by the dotted line, by adding a lens extending speed control device 12 which receives a control signal from the electronic switch 11 and moves the lens in such a manner that the lens extending speed is increased when the control signal is at the low logic level. In this case, a high lens extending speed is used when the object is out of the object distance range during focalization which reduces the time required for focusing the lens on the object. The control device 12 may be formed with an electronic switch and a resistor in a conventional manner.

As is clear from the above description, according to the invention, the electrical focus detecting device is so improved that the object distance range for focus detection is preset. Accordingly, an automatic focalizing device in which erroneous focalization on objects other than the desired object is prevented and the time required for focalization is reduced is provided according to the invention.

What is claimed is:

1. An electrically operated automatic focalizing camera comprising: an electrical focus detecting device for providing a focus detection signal; means for positioning a photographing lens in response to a signal at an input thereto; means for converting a position of said photographing lens into a voltage; means for setting a range of voltage corresponding to a range of amount of extension; means for determining whether or not a voltage corresponding to an amount of extension is in said range of voltage; and means for receiving a decision output from said determining means for controlling transmission of said focus detection signal, said transmission controlling means being operatively coupled between said focus detecting device and said input of said positioning means.

2. The camera as claimed in claim 1 further comprising lens extending speed control means receiving said decision output for controlling a lens extending speed.

3. The camera as claimed in either of claims 1 and 2 wherein said position converting means comprises a potentiometer mechanically operatively coupled to said photographing lens wherein the position of a wiper of said potentiometer is varied in accordance with the position of said lens and wherein said range setting means comprises: first and second comparators; means for applying a first voltage to a positive comparison input of said first comparator; and means for applying a second voltage to a negative comparison input of said second comparator, a negative comparison input of said first comparator and a positive comparison input of said second comparator being coupled to said wiper of said potentiometer.

* * * * *